United States Patent
Biehler

(10) Patent No.: US 8,086,260 B2
(45) Date of Patent: Dec. 27, 2011

(54) TRANSPARENT HANDOVER FOR MOBILE COMPONENTS OF AN AUTOMATION SYSTEM

(75) Inventor: Georg Biehler, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 731 days.

(21) Appl. No.: 12/286,677

(22) Filed: Oct. 1, 2008

(65) Prior Publication Data

US 2009/0117934 A1    May 7, 2009

(30) Foreign Application Priority Data

Oct. 1, 2007   (EP) .................................... 07019277

(51) Int. Cl.
*H04Q 7/20* (2006.01)

(52) U.S. Cl. ........ 455/525; 455/423; 455/424; 455/425; 455/422.1; 455/436; 370/241; 370/244; 370/245; 370/310; 370/331

(58) Field of Classification Search .................. 455/525, 455/423–425, 422.1, 403, 426.1, 426.2, 432.1, 455/432.2, 432.3, 436–445, 514, 515, 500, 455/517, 508, 63.1, 67.11; 370/241, 244, 370/245, 248, 251, 252, 310, 328, 329, 331, 370/332, 338, 343

See application file for complete search history.

(56) References Cited

U.S. PATENT DOCUMENTS

| 7,398,083 | B2 * | 7/2008 | Ying ............................ 455/423 |
| 7,702,330 | B2 * | 4/2010 | Alexander et al. ......... 455/432.1 |
| 2005/0021158 | A1 | 1/2005 | De Meyer et al. |
| 2006/0148481 | A1 | 7/2006 | Boger et al. |
| 2006/0211416 | A1 * | 9/2006 | Snyder et al. ................. 455/423 |

FOREIGN PATENT DOCUMENTS

EP   1 501 062 A1   1/2005

* cited by examiner

*Primary Examiner* — Keith Ferguson

(57) ABSTRACT

The invention relates to a method for transferring data between a mobile component and a controller of an automation system with a link for linking the component to the controller. The component is assigned a memory area in the memory of the controller, in which data to be transferred to the component is stored and copied into memory areas assigned to all links, so that all links provided for communication with the component have the current data available to them, and into which current data is copied by the component out of the memory area of the link in the radio cell of which the component is currently located. For a user application running on the controller of the automation system a handover of the component between different radio cells is transparent, since the application merely accesses the always up-to-date component data in the memory area assigned to the component.

20 Claims, 1 Drawing Sheet

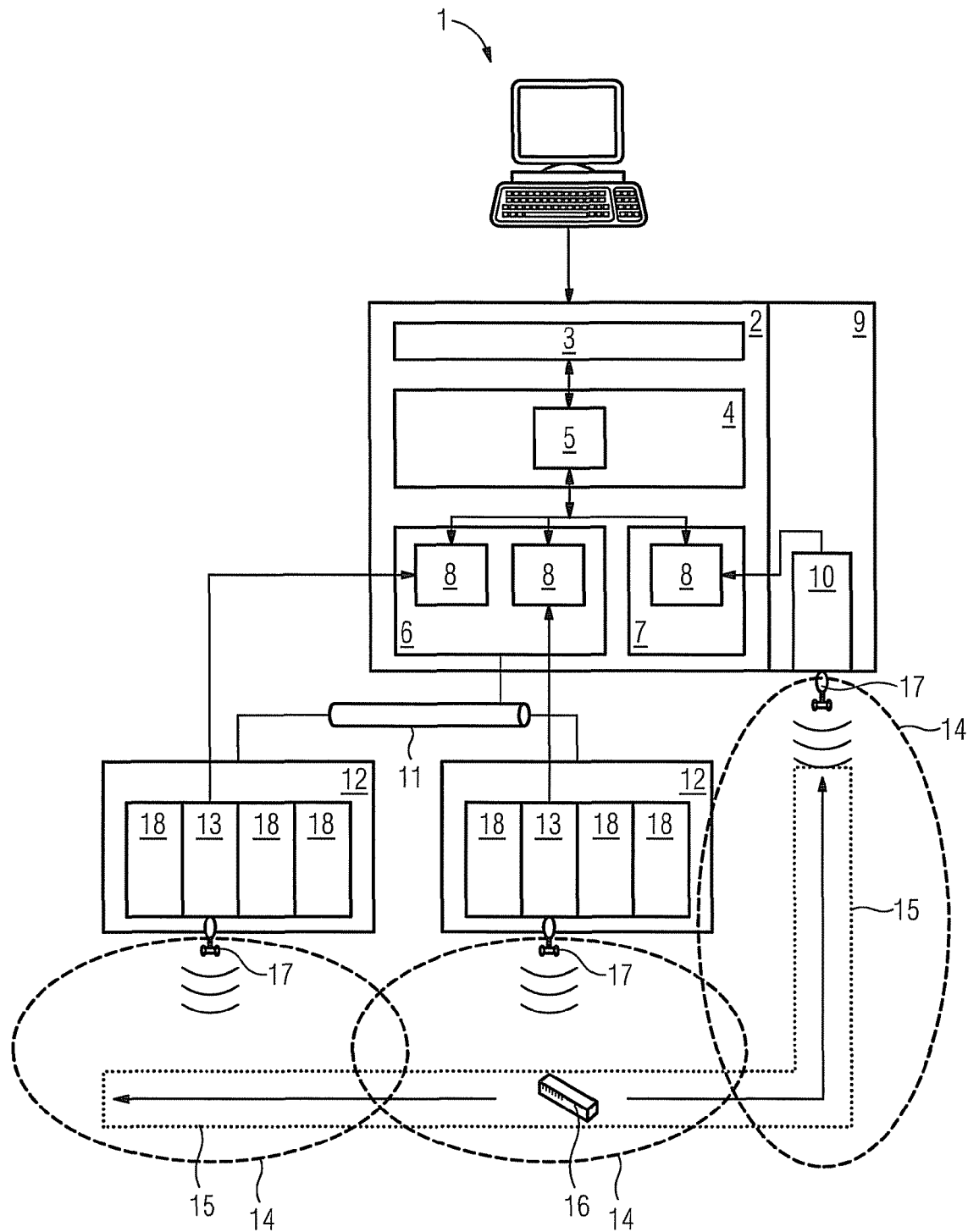

TRANSPARENT HANDOVER FOR MOBILE COMPONENTS OF AN AUTOMATION SYSTEM

CROSS REFERENCE TO RELATED APPLICATIONS

This application claims priority of European application No. 07019277.8 filed Oct. 1, 2007, which is incorporated by reference herein in its entirety.

FIELD OF THE INVENTION

The invention relates to a method for transmission of data between a mobile component and a controller of an automation system with at least one link for linking the component to the controller. The invention also relates to an automation system as well as to an engineering system for project planning of such an automation system.

BACKGROUND OF THE INVENTION

Such a method is used in the field of automation technology where, as well as cable-linked components, those with a wireless communication connection are also used for control of the automation system. Components such as sensors and actuators for example are connected to a controller (abbreviated below to PLC) via central or local I/O modules. For cable-linked sensors (e.g. IO link . . . ) this connection takes the form of central periphery (e.g. digital modules in the rack of the PLC or integrated into the PLC. i.e. central peripheral submodules) or local peripherals (e.g. external digital modules). Connection as central periphery to the PLC is typically via proprietary mechanisms such as a proprietary backplane bus with proprietary protocol for example. Connection as local peripherals is typically undertaken using an IEC61158-standard field bus such as PROFINET IO, PROFIBUS DP, Interbus, CAN and their derivatives, Ethernet/IP, Ethercat . . . .

For wireless components (such as wireless HART or others) this linkage described above is developed correspondingly. Wireless sensors/actuators are also linked to the PLC as centrally or locally embodied links. Such a link is embodied for the PLC as periphery; it serves the wireless sensors/actuators as a wireless access point.

Wireless sensors/actuators are however—by contrast with cabled components—far more "mobile", i.e. they can potentially roam through the installation. This roaming through the installation causes them to pass through several radio cells since a radio cell spanned by a link has a maximum geographical extent. Each radio cell is covered by an access point. The transfer to the next access point is supported by handover.

Handover is transparent to current wireless applications (for example making calls on a cell phone). If one of the parties to the call is moving out of the radio cell that they are currently using, the cell phone will automatically be transferred to the next cell (handover); the calling party and the called party do not notice this at all.

If wireless (mobile) components such as sensors/actuators use handover, the component is automatically handed over when roaming by the underlying wireless network protocol from access point to access point if it leaves a radio cell spanned by one access point and enters a radio cell spanned by another access point. It is assumed in this case that the component is handed over uniquely from access point to access point, i.e. is always assigned to precisely one access point. This is done by the underlying wireless network protocol.

Since the mobile component considered appears at different links (the link is thus the access point in relation to the component), but the link is linked in the upwards direction as central or local periphery to the PLC, this can be achieved with today's linkage mechanisms only in the following way:

The component must be planned in at all links which cover the roaming area of the component.

Each of the links reserves an explicit address area in the periphery data of the controller.

The handover of a component leads to diagnostic messages such as

Component failure at old link and

Component restoration at new link

After handover of the component its values appear at other locations in the periphery data.

This means that an application running on the automation system must evaluate the diagnostic messages and control access to the corresponding address area in the periphery data in order to arrive at the data of the component. This leads to very complex applications.

SUMMARY OF THE INVENTION

The underlying object of the invention is to specify a method and an automation system with which data of a mobile component can be accessed just as easily as that of a cabled component.

This object is achieved by a method of the type stated at the outset by the component being assigned a second memory area in the memory and data to be transferred from the controller to the component being stored in the second memory area and copied from the second memory area into the first memory area of each link and/or data to be transferred from the component to the controller being copied from the first memory of the respective active link into the second memory area.

The object is further achieved by an automation system as well by an engineering system with the features specified in the claims.

The method relates to a transmission of data between a mobile component and a controller of an automation system with at least one link for linking the component to the controller, with each link being provided with a communication connection to the controller and a radio interface for establishing a wireless connection to the component, each link being assigned a first memory area in a memory of the controller, when the component enters or leaves a radio coverage area of each link, a corresponding diagnostic message being created in each case, which is transferred to the controller, on the basis of the diagnostic messages an active link, in the radio coverage area of which the component is located, being determined by the controller in each case, data being transferred between the component and the controller by the active link, with data to be transferred from the controller to the component being read out of the assigned first memory area and sent by means of radio interface to the and/or data to be transmitted from the component to the controller being received by means of the radio interface and written into the assigned first memory area.

The assignment of a second memory area (with associated address area) to the mobile component, from which data to be transmitted can be copied by the controller to the component (e.g. an actuator) into the first memory area of each link and/or into which data to be transmitted from the component (e.g. a sensor) to the controller can be copied from the first memory area of the respective active link, enables an application running on the automation system to exchange data with the mobile component by writing into or reading from the second memory area. Thus the current data is available for the or from the mobile component in the second memory area in each case, which can be accessed by the application under (only) one address.

In this case data from an automation operating system (i.e. the controller), which is to be transmitted to a mobile component such as an actuator for example, is copied into the first memory area of each link, so that, even if the component roams out of the radio cell of a link into the radio cell of another link—i.e. during a handover from one access point to another access point—the new link also has the respective current data available for the component. Conversely data from a mobile component such as a sensor for example, which is to be transmitted to the PLC (or to an application running on it), is only copied from the first memory area of the respective active link into the second memory area since only the respective active link—seen by the sensor as the access point in the radio cell of which the sensor is currently located—has the current sensor data available.

The copying of the data between first memory area(s) and second memory area(s) is "invisible" to the application; This always accesses the data of the mobile component via the second memory area, i.e. via the same address. Thus the inventive solution causes the application to see no difference between a mobile component and a cabled component, since the handover of the component from one access point to the next access point for is transparent for the application. The result is a greatly simplified utilization of such components (such as sensors/actuators) by comparison with the current possible solution.

In an advantageous form of the embodiment the component is assigned parameters. This means that the mobile component with its parameters is available to an application at precisely one address with precisely one parameterization. This parameterization is multiplied by an engineering system or the automation operating system onto the respective links.

In a further advantageous embodiment the automation system has a set of links from which a subset is configured for linking the component to the controller. In this case the subset does not have to be a true subset of the set of links. This allows a user to configure the links at which the component may appear, i.e. in which radio cells (along the roaming area of the component) it is to be detected. The information for the component data in the first memory areas, meaning for example the first memory areas into which data to be transmitted to an actuator is to be copied, is derived from this assignment. This information is hidden for the application however; it is used only for internal handling at runtime.

In a further advantageous embodiment an alarm signal is generated by means of the controller if, based on the diagnostic messages, an active link cannot be determined within a configurable alarm time. This means that provided, after a component outage, a corresponding component restoration occurs within a "short" time (or has occurred with overlapping radio cells), the handover is transparent for the application running on the controller, else the application signals an alarm. Three times the updating time (of the component data) can for example be set as the alarm time.

In a further advantageous embodiment the assignment of the second memory area and/or the parameterization to the component and/or the configuration of the link for linking the component to the controller and/or the setting the alarm time can be undertaken by means of an engineering system. This enables a user to undertake the complete project planning of the automation system including all for the parameters needed for the inventive solution in a simple way by means of an (inventive) engineering system provided for the purpose.

BRIEF DESCRIPTION OF THE DRAWINGS

The invention is described and explained in more detail below on the basis of the exemplary embodiment shown in the FIGURE. The FIGURE shows a schematic diagram of an inventive automation system.

DETAILED DESCRIPTION OF THE INVENTION

The FIGURE shows an automation system 2-18 with a Programmable Logic Controller (PLC) 2, on which a (user) application 3 runs. In the rack of the PLC 2 is located a digital module as central periphery 9, which is linked in via a proprietary or standardized backplane to the PLC 2 and is provided with a link 10 for wireless linkage to a mobile component 16. In addition the automation system 2-18 also features IO devices as local periphery 12, with the IO devices 12 each also having a link 13 for wireless connection of a mobile component 16 to the controller 2 as well as further modules 18. The local periphery 12 is linked to the PLC 2 for example via a field bus 11 with any given field bus protocol such as IEC61158 for example, the inventive method is however independent of the actual communication link. It is likewise independent of the communication link of the mobile component 16 to the respective link 10, 13, i.e. the mobile component 16 can be linked via any given "Wireless Communication Protocol" to the links 10, 13—for example based on 802.11 (WLAN), on 802.15.4 (e.g. WSAN, wireless HART, . . . ), on 802.15.1 (Bluetooth) or on other wireless variants.

A link 10, 13 spans a radio cell 14 via its access point 17. In the engineering (by planning by means of an engineering system 1 for example) or in the real installation (empirically and by trial and error) the links 10, 13 are placed so that the radio cells 14 cover the intended roaming area 15 of the mobile component 16, e.g. of a wireless sensor or actuator.

In the engineering system 1 the user plans into the project the mobile component 16 with its parameters and its address relevant for the user application 3, which identifies a memory area 5 assigned to the component 16, in a process image 4. The component (sensor/actuator) 16 in this case has precisely one address and one set of parameters in relation to the application. The engineering (system 1) is to be prepared accordingly. In addition the user configures the links 10, 13 at which the component 16 may appear, i.e. in which radio cells 14 the sensor/actuator 16 is to be detected. The information for the sensor/actuator data 8 in the local 6 or central periphery data 7 is derived from this configuration by each link 10, 13 being assigned a first memory area for the sensor/actuator data 8. This information is however hidden for the user application 3; it is used only for internal handling at runtime.

As regards the mapping of the component data 8 into the periphery data 6, 7 in the component data 5 available to the user application 3 in the process image 4, the following rules apply:

For a wireless sensor 16—as seen by the user application these are inputs—the sensor data 8, which originates from the link 10, 13 in the radio cell 14 of which the sensor 16 is currently located. Thus this sensor data 8 is copied into the sensor data 5 of the process image 4. Diagnostic messages about sensor failures or sensor restoration are used internally to select the current source 8 for the sensor data 5; They do not impact on the user application 3, provided the sensor 16 is transferred by handover into a new radio cell 14, which was likewise assigned by the user, i.e. was configured for connection of the component 16. Provided a corresponding sensor restoration is undertaken within a short interval after the outage of the sensor (e.g. a maximum of three times the updating time), the handover is transparent for the user application 3. Else the application 3 signals an alarm.

For a wireless actuator 16—as seen by the user application 3 these are outputs—the actuator data 5 is duplicated to all actuator data 8 in the local 6 and central periphery data 7. This means that each link 10, 13 always has the current output data. Actuator outages or actuator restoration are "ignored" internally, since each link 10, 13 always receives the current output data 5, 8; they also do not impact on the user application 3 provided the actuator 16 is transferred by handover into a new radio cell 14 which was also assigned by the user. I.e. provided a corresponding actuator restoration is undertaken within a short interval after the outage of the actuator (e.g. a maximum of three times the updating time), the handover is transparent for the user application 3. Otherwise the application 3 signals an alarm.

With the inventive solution, the application 3 sees no difference between a mobile ("roaming") component 16 and a ("tethered") component. The result is a greatly simplified usage of such mobile components 16, such as sensors or actuators for example, by comparison with the solution currently possible.

To summarize, the invention relates to an automation system, an engineering system as well as a method for transmission of data between a mobile component and a controller of an automation system with at least one link for linking the component to the controller. To enable data of the mobile components to be accessed just as easily as that of cabled components, it is proposed that the component be assigned a memory area in the memory of the controller of the automation system, in which on the one hand data to be transmitted to the component is stored and copied into memory area assigned to all links, so that all links provided for communication with the component have the current data available to them, and into which on the other hand current data from the component is copied from the memory area of the link in the radio cell of which the component is currently located. For a user application running on the controller of the automation system in this case a handover of the component between different radio cells is transparent, since the application merely accesses the always current component data in the memory area assigned to the component.

The invention claimed is:

1. A method for transferring data between a component and a controller of an automation system by a link for linking the component to the controller, comprising:
    creating a diagnostic message when the component enters and leaves a radio coverage area of the link;
    transferring the diagnostic message by a network protocol to the controller;
    determining the link in the radio coverage area by the controller based on the diagnostic messages;
    assigning a first memory area in a memory of the controller to the link;
    assigning a second memory area in the memory of the controller to the component;
    transferring data between the component and the controller by the link; and
    copying the data between the first memory area and the second memory area.

2. The method as claimed in claim 1, wherein the component is assigned a parameterization.

3. The method as claimed in claim 1, wherein the automation system comprises a set of links and a subset of the links connects the component to the controller.

4. The method as claimed in claim 1, wherein an alarm signal is generated by the controller based on the diagnostic messages if the link cannot be determined within an alarm time.

5. The method as claimed in claim 1, wherein an engineering system assigns the second memory area, a parameterization to the component, a configuration of the link, or a setting of an alarm time.

6. The method as claimed in claim 1, wherein the link comprises a communication connection to the controller and a radio interface for establishing a wireless connection to the component.

7. The method as claimed in claim 6, wherein data to be transferred from the controller to the component is read out from the first memory area and sent to the component by the radio interface.

8. The method as claimed in claim 6, wherein data to be transferred from the component to the controller is received by the radio interface and written into the first memory area.

9. The method as claimed in claim 1, wherein data to be transferred from the controller to the component is stored in the second memory area and copied from the second memory area into the first memory area.

10. The method as claimed in claim 1, wherein data to be transferred from the component to the controller is copied from the first memory area into the second memory area.

11. An automation system, comprising:
    a component;
    a controller comprising a memory with a first memory area and a second memory area; and
    a link comprising a communication connection to the controller and a radio interface for establishing a wireless connection to the component,
    wherein the first memory area is configured to be assigned to the link and the second memory area is configured to be assigned to the component,
    wherein the controller is configured to determine the link when the component enters and leaves a radio coverage area of the link, and
    wherein the link is configured to transfer data between the component and the controller and the data is copied between the first memory area and the second memory area.

12. The automation system as claimed in claim 11, wherein a diagnostic message is generated when the component enters and leaves the radio coverage area of the link and transferred to the controller for determining the link.

13. The automation system as claimed in claim 11, wherein data to be transferred from the controller to the component is read out of the first memory area and sent by the radio interface to the component.

14. The automation system as claimed in claim 11, wherein data to be transferred from the component to the controller is received by the radio interface and written into the first memory area.

15. The automation system as claimed in claim 11, wherein data to be transferred from the controller to the component is stored in the second memory area and copied from the second memory area into the first memory area.

16. The automation system as claimed in claim 11, wherein data to be transferred from the component to the controller is copied from the first memory area into the second memory area.

17. The automation system as claimed in claim 11, wherein the component is assigned a parameterization.

18. The automation system as claimed in claim 11, further comprising a set of links and a subset of the links connects the component to the controller.

19. The automation system as claimed in claim 11, wherein an alarm signal is generated by the controller based on the diagnostic messages if the link cannot be determined within an alarm time.

20. The automation system as claimed in claim 11, further comprising an engineering system that assigns the second memory area, a parameterization to the component, a configuration of the link, or a setting of an alarm time.

\* \* \* \* \*